(12) United States Patent
McManus et al.

(10) Patent No.: US 8,989,657 B2
(45) Date of Patent: Mar. 24, 2015

(54) RADIO FREQUENCY ACCESS CONTROL SYSTEM AND METHOD

(75) Inventors: David McManus, Milford, NH (US); Robert Alan Gott, Milford, NH (US)

(73) Assignee: Near Field Magnetics, Inc., Milford, NH (US)

( * ) Notice: Subject to any disclaimer, the term of this patent is extended or adjusted under 35 U.S.C. 154(b) by 224 days.

(21) Appl. No.: 13/415,419

(22) Filed: Mar. 8, 2012

(65) Prior Publication Data

US 2012/0231733 A1    Sep. 13, 2012

Related U.S. Application Data

(60) Provisional application No. 61/450,449, filed on Mar. 8, 2011.

(51) Int. Cl.
*H04B 5/00* (2006.01)
*H04B 5/02* (2006.01)

(52) U.S. Cl.
CPC ............................. *H04B 5/02* (2013.01)
USPC .......................... 455/41.1; 343/866

(58) Field of Classification Search
USPC .......................... 455/41.1; 343/866
See application file for complete search history.

(56) References Cited

U.S. PATENT DOCUMENTS 3,619,772 A * 11/1971 Ellis .............................. 324/249
6,160,798 A * 12/2000 Reed et al. .................... 370/331

8,823,378 B2 * 9/2014 Hardy et al. .................. 324/318
2003/0085766 A1 * 5/2003 Rogerson ........................ 331/57
2004/0055346 A1 * 3/2004 Gillert ............................. 70/276
2008/0246667 A1 * 10/2008 Symons ......................... 343/702
2009/0033467 A1 * 2/2009 Finocchiaro et al. ........ 340/10.1
2009/0081943 A1 * 3/2009 Dobyns et al. ................... 455/1

(Continued)

OTHER PUBLICATIONS

IEEE, IEEE Standard for Long Wavelength Wireless Network Protocol, Mar. 31, 2009, IEEE Communications Society, IEEE Std 1902.1-2009, p. 20.*

(Continued)

*Primary Examiner* — Hai V Nguyen
(74) *Attorney, Agent, or Firm* — Ross Krutsinger; Mesmer & Deleault, PLLC (57) ABSTRACT

An access control system includes a transmitter initiator that has a magnetic flux antenna constructed and arranged to direct magnetic energy in an angular direction, a plurality of RF tone detectors, a microcontroller, and a plurality of RF burst generators. The system includes at least one receiver responder that has a magnetic flux antenna, a plurality of RF tone detectors, a microcontroller, and a RF burst generator. The transmitter initiator's magnetic flux antenna and the receiver responder's magnetic flux antenna define an open-air gap therebetween. The transmitter initiator's magnetic flux antenna has a paramagnetic housing, electromagnetic windings within the paramagnetic housing, and at least one ferromagnetic element disposed within the open air gap. The paramagnetic housing and the ferromagnetic element are constructed and arranged to direct a magnetic field across the open air gap. The system is configured for wireless communication via near-field magnetic induction.

18 Claims, 8 Drawing Sheets

(56) References Cited

U.S. PATENT DOCUMENTS

| | | |
|---|---|---|
| 2009/0224990 A1 | 9/2009 | Cezanne et al. |
| 2009/0227205 A1* | 9/2009 | Rofougaran ................ 455/41.1 |
| 2010/0073129 A1* | 3/2010 | Pukari ............................ 340/5.8 |
| 2010/0213929 A1* | 8/2010 | Gregg et al. ............. 324/207.15 |
| 2010/0222010 A1* | 9/2010 | Ozaki et al. ..................... 455/77 |
| 2012/0161767 A1* | 6/2012 | Hardy et al. .................. 324/318 |
| 2012/0168520 A1* | 7/2012 | Finocchiaro et al. ......... 235/492 |
| 2013/0171933 A1* | 7/2013 | Rofougaran ................ 455/41.1 |

OTHER PUBLICATIONS

Fang et al., Research on FFT-based Large Integers Multiplication, Dec. 26-28, 2009, Information Science and Engineering (ICISE), 2009 1st International Conference on Information Science and Engineering, ISBN: 978-1-4244-4909-5, pp. 3835-3838.*

PCT International Search Report of the Korean Intellectual Property Office in PCT/US2012/028288.

* cited by examiner

RADIO FREQUENCY ACCESS CONTROL SYSTEM AND METHOD

BACKGROUND OF THE INVENTION

1. Field of the Invention

The invention relates to access control systems and more particularly to a radio frequency (RF) access control system and method.

2. Description of the Prior Art

Access control relates to the management of an entity's ability to legitimately pass through a gateway in an authorized manner. Historically, access control has been handled in many different ways including lock and keys, guards, passwords, and biometrics.

One popular method of access control involves the use of corresponding transceivers that communicate with each other to indicate that an entity is authorized to pass through the gateway. In use, a first transceiver (e.g., transmission initiator) remains stationary at the gateway. A second transceiver (e.g., receiver transponder) is carried by the entity seeking access through the gateway. As the second transceiver approaches the first transceiver, the pair of transceivers communicates with each other to indicate that entity is authorized to enter the gateway.

One type of transceiver pair access control system utilizes radio waves to communicate between transceiver pairs. Current technologies for this type of system operate in several frequency bands including the 13.56 MHz, 915 MHz, and 2.45 GHz bands. These types of systems are generally referred to as far field because the transmissions radiate into free space Another type of transceiver pair access control system utilizes near field magnetic induction to communicate between transceiver pairs. Current technologies for this type of system operate in several frequency bands including frequencies between 120 KHz-135 KHz. In the 120 KHz-135 KHz band, communication between devices is limited to distances of less than 10 cm. These types of systems are generally referred to as near field because transmissions are contained within a localized magnetic field or communication "bubble" that surrounds a communication device such as a radio, headset, or microphone.

SUMMARY OF THE INVENTION

The above-described conventional transceiver pair access control systems have several deficiencies. For example, the lower frequency devices are range limited to several centimeters (often 4 cm or less), which would require an entity seeking access through a gateway to physically place the two transceivers within a very close proximity. The entity ends up wasting time and effort finding and manipulating a transceiver instead of just passing through the gateway.

Another deficiency is that high frequency systems are subject to various degrees of signal interference. This interference can include interference from surrounding structures, external radio frequency interference, and interference due to weather such as rain and snow. Interference can prevent the transceiver pairs from effectively communicating with each other which could erroneously prevent an authorized entity from being appropriately identified as authorized to pass through the gateway.

Yet another deficiency is that all conventional systems require specific antenna orientations as well as an unobstructed line of sight between the transceivers. The configuration of specific antenna orientations can be cumbersome and expensive to set up. Unobstructed line of sight requirements place additional burdens on gateway access users that can cause frustration.

In urban areas, controlled entrances face the issue of multiple receiver responders arriving concurrently when the transmit range of the transmitter initiator is large (i.e. meters, not centimeters). Further, some access control applications exist in which the approach direction of a receiver responder is significant such that only approach from specific directions should allow access.

It is not easy to create an access control system in which the velocity of multiple, arbitrarily positioned, and arbitrarily oriented receiver responders relative to a fixed transmitter initiator is changing. Conventional systems have overcome this issue by requiring a close coupling of the transmitter initiator and receiver responder in a controlled geometric manner or by limiting the read point to a single receiver responder. These restrictions limit the number of applications where automatic access control can be applied and require manipulative action by the user.

In contrast to the above described conventional transceiver pair access control systems, an improved access control system of the present invention provides a transmission initiator having a directional magnetic flux antenna and a receiver responder with an omnidirectional magnetic flux antenna. The directional magnetic flux antenna utilizes a combination of electromagnetic windings, a paramagnetic housing, and ferromagnetic elements to direct a magnetic field in a particular direction over an extended distance. The system is configured to direct magnetic energy into a specific angular region. The system also directs that same energy in a plurality of orientations with respect to multiple receiver responders and a transmitter initiator. Thus, in a system in which the approach direction is significant, one object of the invention is to provide a system that is able to correctly and effectively control access without constraints on the distance between the transmitter initiator and the receiver responder.

It is another object of the invention to provide an access control system with a magnetic flux detection and adjustment method that adapts itself to rapid nonlinear changes in intensities of the magnetic flux between multiple receiver responders and a transmitter initiator. This detection and adjustment method allows robust communication by accommodating the rapid relative changes in distance between a transmitter initiator and multiple receiver responders that is observed in practice. This is significant because a change in the distance between a transmitter initiator and a receiver responder corresponds to an exponential increase in magnetic flux intensity. This is due to the inverse distance relationship for magnetic flux intensity, which is a cubic function.

It is another object of the present invention to provide an access control system and method that provides transmission of multiple symbols using magnetic flux and its detection to form a communication protocol useful for identifying authorized entities. These communication protocols enable the system to prevent unauthorized individuals from spoofing the communication stream and compromise security by passing through the gateway unnoticed.

It is another object of the present invention to provide a system and method that utilizes a magnetic flux transmission modulation scheme that varies in both intensity and direction. By modulating a near-field magnetic field, the present invention improves on problems associated with longer range, higher frequency systems. Variations in magnetic flux intensity and direction during the transmitter initiator transmit sequence, coupled with transmitter initiator receiver time gating, enables a transmitter initiator to initiate a response communication sequence with a single receiver, among many that may be present. Communication links using this method may, over time, be first established and then abolished, thereby allowing communication with multiple receiver responders. Controlled access from multiple receiver responders can therefore be determined by a single transmitter initiator.

It is another object of the present invention to provide data transmission using near-field magnetic flux as a transmission medium. This medium eliminates the limitations of electrical field transmissions which are obstructed, reduced, or distorted in and amongst urban structures.

The present invention achieves these and other objectives by providing a radio frequency access control system and method. In one embodiment, an access control system has at least one receiver responder with a receiver responder magnetic flux antenna configured to direct magnetic energy in any angular direction, a plurality of RF tone detectors electromagnetically coupled with the receiver responder magnetic flux antenna, a microcontroller electrically coupled with the plurality of RF tone detectors, and a responder RF burst generator disposed in electrical communication with the microcontroller and the receiver responder magnetic flux antenna.

The system also has a transmitter initiator that includes a transmitter initiator magnetic flux antenna constructed and arranged to direct magnetic energy in an angular direction. The transmitter initiator magnetic flux antenna and the receiver responder magnetic flux antenna define an open-air gap therebetween. The transmitter initiator magnetic flux antenna has a paramagnetic housing, electromagnetic windings disposed within the paramagnetic housing, and at least one ferromagnetic element disposed within the open-air gap. The paramagnetic housing and the ferromagnetic element are constructed and arranged to direct a magnetic field across the open air gap. The transmitter initiator also has a plurality of RF tone detectors disposed in electromagnetic communication with the transmitter initiator magnetic flux antenna, a transmitter initiator microcontroller disposed in electromagnetic communication with the plurality of RF tone detectors, and a plurality of RF burst generators disposed in electrical connection with the transmitter initiator microcontroller and with the transmitter initiator magnetic flux antenna.

In another embodiment of the access control system, the transmitter initiator magnetic flux antenna is configured as a focused-beam directional antenna.

In another embodiment of the access control system, the receiver responder magnetic flux antenna is configured as an omni-directional or plane-focused antenna.

In another embodiment of the access control system the receiver responder(s) also include a power amplifier disposed in electrical communication with the receiver responder magnetic flux antenna. The power amplifier may be an adjustable gain amplifier with at least one gain stage that utilizes a voltage-controlled resistor.

In another embodiment of the access control system, the system also has a power amplifier electrically coupled to the transmitter initiator magnetic flux antenna. The power amplifier may be an adjustable gain amplifier with at least one gain stage that utilizes a voltage-controlled resistor.

In another embodiment of the access control system, the receiver responder(s) is a fob, a smart card, or a portable device that is communication-operable with near-field magnetic inductance.

In another embodiment of the access control system, the open air gap is from about 2 to about 5 meters.

In another embodiment of the access control system, the transmitter initiator is configured to wirelessly communicate with the receiver responder via near-field magnetic induction between the transmitter initiator magnetic flux antenna and the receiver responder magnetic flux antenna.

In another embodiment of the access control system, the transmitter initiator and the receiver responder are configured to wirelessly communicate a signal from about 120 KHz to about 135 KHz.

A method of access control includes the steps of generating one or more RF bursts at a transmitter initiator, summing the at least one RF burst into a summed RF burst signal, transforming the summed RF burst signal into a drive current, conducting the drive current through coil windings of a transmitter magnetic flux antenna, transmitting an RF initiator signal via magnetic induction across an open air gap to at least one receiver responder, receiving the RF initiator signal across the open air gap by one or more receiver responders where the receiver responder has a receiver responder magnetic flux antenna and a RF tone detector, detecting, by the at least one receiver responder, a frequency of the RF transmitter signal, based on the frequency of the RF transmitter initiator signal, generating a serial data stream having a unique identifier corresponding to the at least one receiver responder, the receiver responder transmitting at least one responder tone burst containing the serial data stream, receiving the responder tone burst at a transmitter initiator magnetic flux antenna, the transmitter initiator demodulating the responder tone burst to provide a unique identifier value, and determining whether access is permitted based on the unique identifier value.

In another embodiment of a method of access control, the method includes configuring the transmitter magnetic flux antenna as a focused-beam antenna.

In another embodiment of a method of access control, the method includes configuring the receiver magnetic flux antenna as an omni-directional antenna.

In another embodiment of a method of access control, the step of generating a serial data stream further comprises the steps of generating a plurality of RF bursts and amplifying the plurality of RF bursts. Amplification of the plurality of RF bursts may be performed by using an adjustable gain amplifier.

In another embodiment of a method of access control, the method includes the step of the transmitter initiator modulating the RF initiator signal in at least one of intensity, frequency, phase, direction, or any combination of these.

In another embodiment of a method of access control, the modulating step utilizes Frequency Shift Keying modulation.

In another embodiment of a method of access control, the RF initiator signal and the responder tone burst are between about 120 KHz and about 135 KHz.

In another embodiment of a method of access control, the RF initiator signal includes a unique identifier comprising a sequence of real, imaginary, or complex numbers.

In another embodiment of a method of access control, the method includes the steps of establishing a first communication link with a first one of the at least one receiver responder, abolishing the first communication link with the first one of the at least one receiver responder, and establishing a second communication link with a second one of the at least one receiver responder.

DETAILED DESCRIPTION OF THE PREFERRED EMBODIMENT

Figure 1:
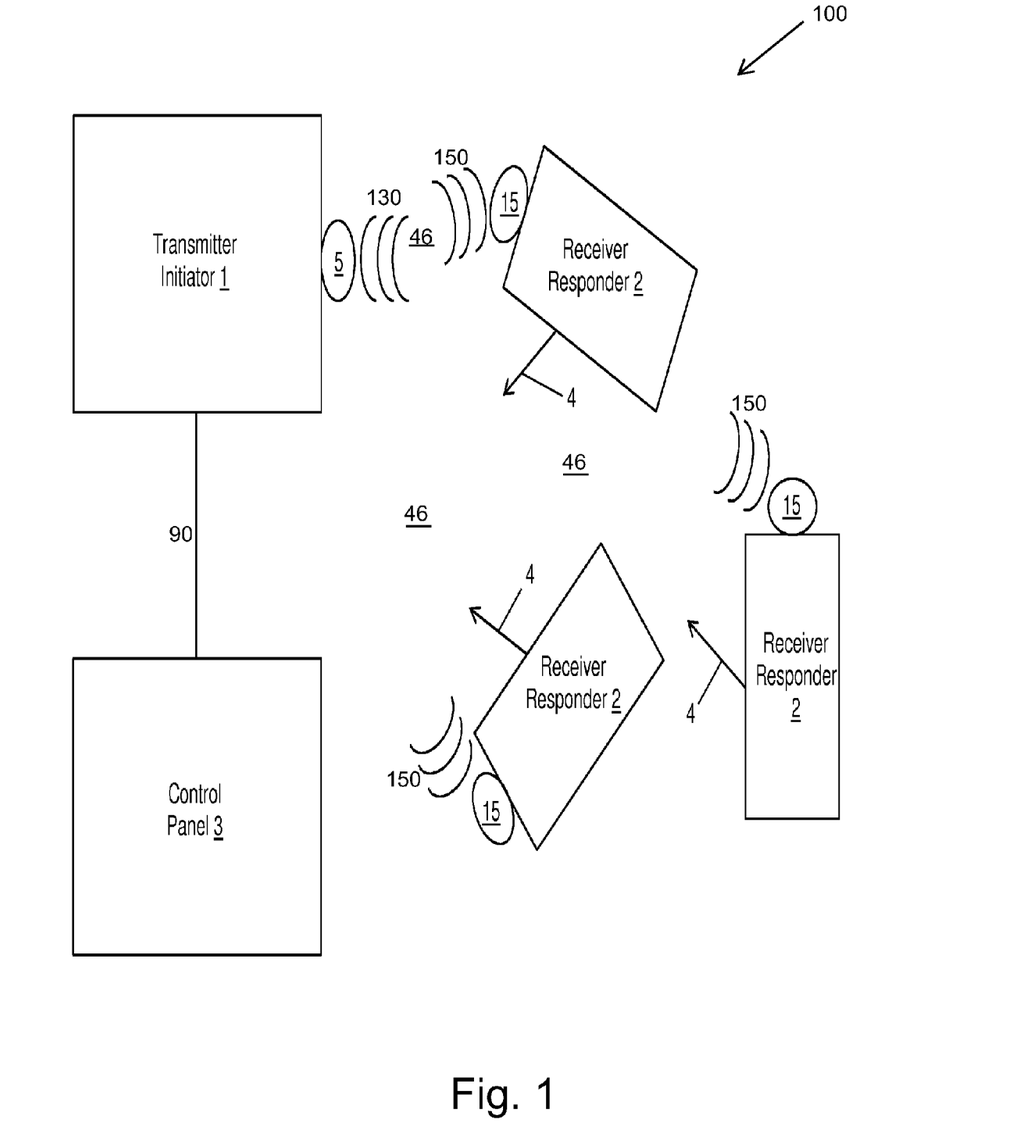
FIG. 1 is a block diagram of an embodiment of a control access system.

The preferred embodiments of the present invention are illustrated in FIGS. 1-9. FIG. 1 illustrates an embodiment of an access control system 100 that includes a transmitter initiator 1, one or more receiver responders 2, and a control panel 3. Each receiver responder 2 has an antenna 15 and transmitter initiator 1 has an antenna 5. Preferably, system 100 includes a plurality of receiver responders 2 positioned and oriented in an arbitrary manner with respect to transmitter initiator 1. Transmitter initiator 1 is electrically coupled to an access control panel 3.

Each receiver responder 2 is configured to be moved with respect to transmitter initiator 1 at a variety of different velocities represented by velocity vectors 4. In access control system 100, the direction in which receiver responder(s) 2 approach transmitter initiator 1 is significant. By directing magnetic energy into a specific region, system 100 correctly and effectively controls access while, at the same time, not constraining the distance between transmitter initiator 1 and receiver responder 2. Accordingly, system 100 is configured to direct magnetic energy into a specific angular region, while also directing that same energy in a plurality of orientations with respect to multiple receiver responders 2 and transmitter initiator 1.

Control panel 3 is one of many control panels as are known in the art. After transmitter initiator 1 demodulates a received signal 150, transmitter initiator 2 communicates a signal 90 to control panel 3 where signal 90 contains a unique identifier corresponding to a receiver responder 2. Control panel 3 checks the value of unique identifier included in signal 90 against stored or accessed values to determine whether access should be granted. For example, if the unique identifier value in signal 90 matches a value stored in control panel 3, access is granted and control panel 3 controls operation of a gate or lock to permit access.

Figure 2:
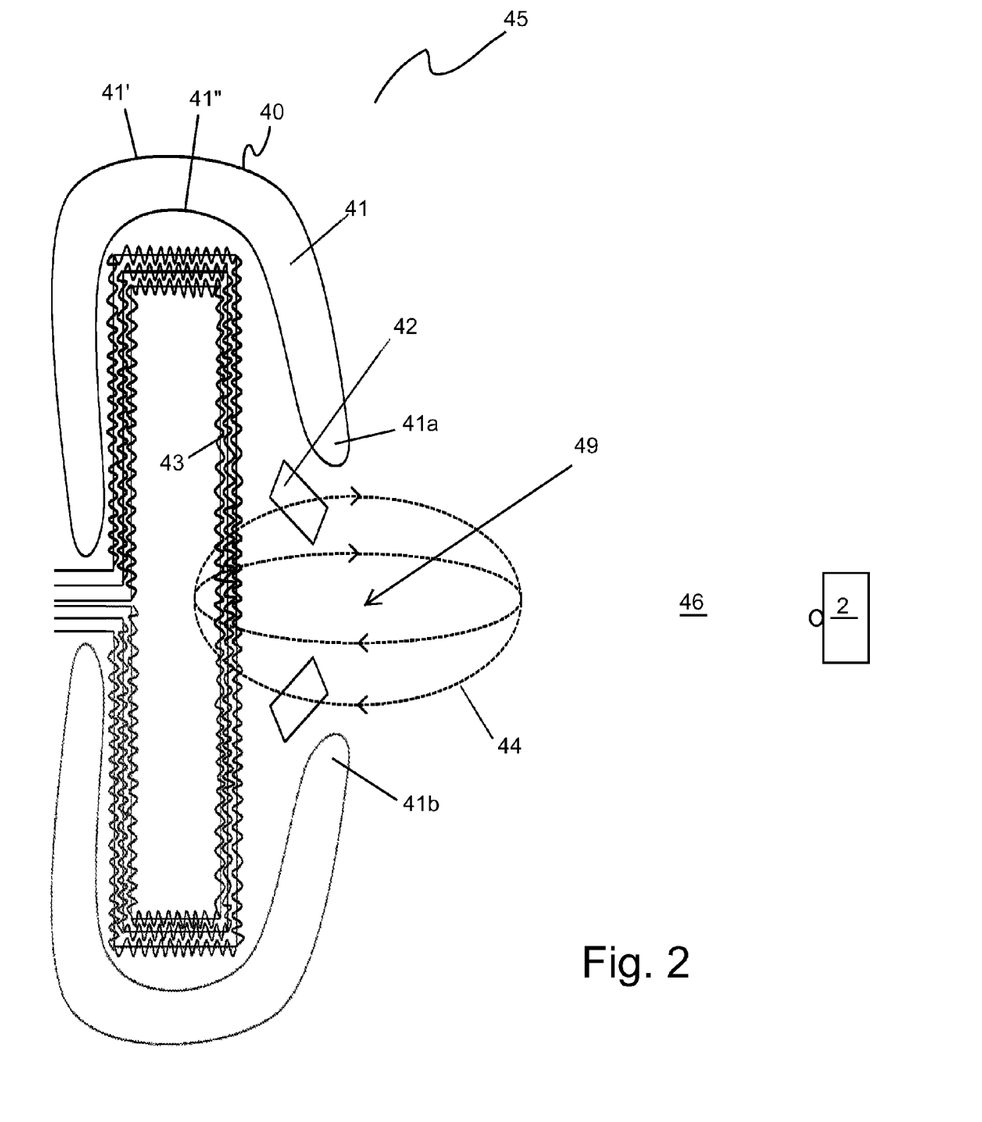
FIG. 2 is a block diagram of a magnetic flux antenna component of the control access system of FIG. 1.

FIG. 2 shows a cross-section of one embodiment of antenna 5, 15 that is a directional magnetic flux antenna 40. Directional magnetic flux antenna 40 includes electromagnetic windings 43, a paramagnetic housing 41, and one or more ferromagnetic elements 42 to direct a magnetic field in a particular direction over an extended distance. Housing 41 and ferromagnetic elements 42 direct a magnetic field 44 across an open-air gap 46 between transmitter 1 initiator and receiver responder 2. Open-air gap 46 may be as small as 1 cm or as large as 5 meters or more. Open-air gap is optimally about 7 meters and preferably between 2 and 5 meters.

The function of directional magnetic flux antenna 40 is to both focus magnetic flux during transmit and to receive flux about multiple rotational orientations. When transmitting, antenna flux lines 44 are focused as shown in FIG. 2 along one side of antenna 40. This effect occurs due to the use of paramagnetic and ferromagnetic materials (e.g. housing 41 and elements 42, respectively) arranged about multiple windings 43. The combination of paramagnetic housing 41, ferromagnetic elements 42, and windings 43 creates a magnetic circuit 45. The magnetic circuit concentrates magnetic flux lines 44 within paramagnetic 41 and ferromagnetic materials 42, as well as directing a concentration of flux lines 44 across an open-air gap 46 to a point in space that is external to magnetic flux antenna 40. The shape of magnetic flux 44 is a function of the placement of paramagnetic housing 41, ferromagnetic elements 42, and electromagnetic windings 43. By adjusting the spacing and orientation of these components, magnetic flux antenna 40 may be configured to function as a focused-beam antenna 5 in transmit initiator 1. Magnetic flux antenna 40 may optionally omit paramagnetic housing 41 and ferromagnetic elements 42 to provide an omni-directional magnetic flux antenna. Receiver responder 2 preferably has antenna 15 configured as an omni-directional antenna, but antenna 15 may optionally be directional magnetic flux antenna 40.

Housing 41 is preferably constructed of mu-metal or equivalent paramagnetic material. Mu-metal is a nickel-iron alloy with high permeability and effective screening of low-frequency magnetic fields. Preferably housing 41 has an inner sphere 41" within an outer sphere 41', where spheres 41', 41" of housing 41 are separated by a distance of approximately 5-15 mm. An opening 49 is located at one pole of housing 41. Coil windings 43 are located within the inner sphere 41". Ferromagnetic elements 42 are placed in inner sphere 41" to shape magnetic field 44 and focus the magnetic field 44 to a target. Ferromagnetic elements 42 may be mu-metal or other ferromagnetic material. Magnetic flux antenna 40 may have various other shapes, including flat panels and rectangular boxes with an open side.

Figure 3:
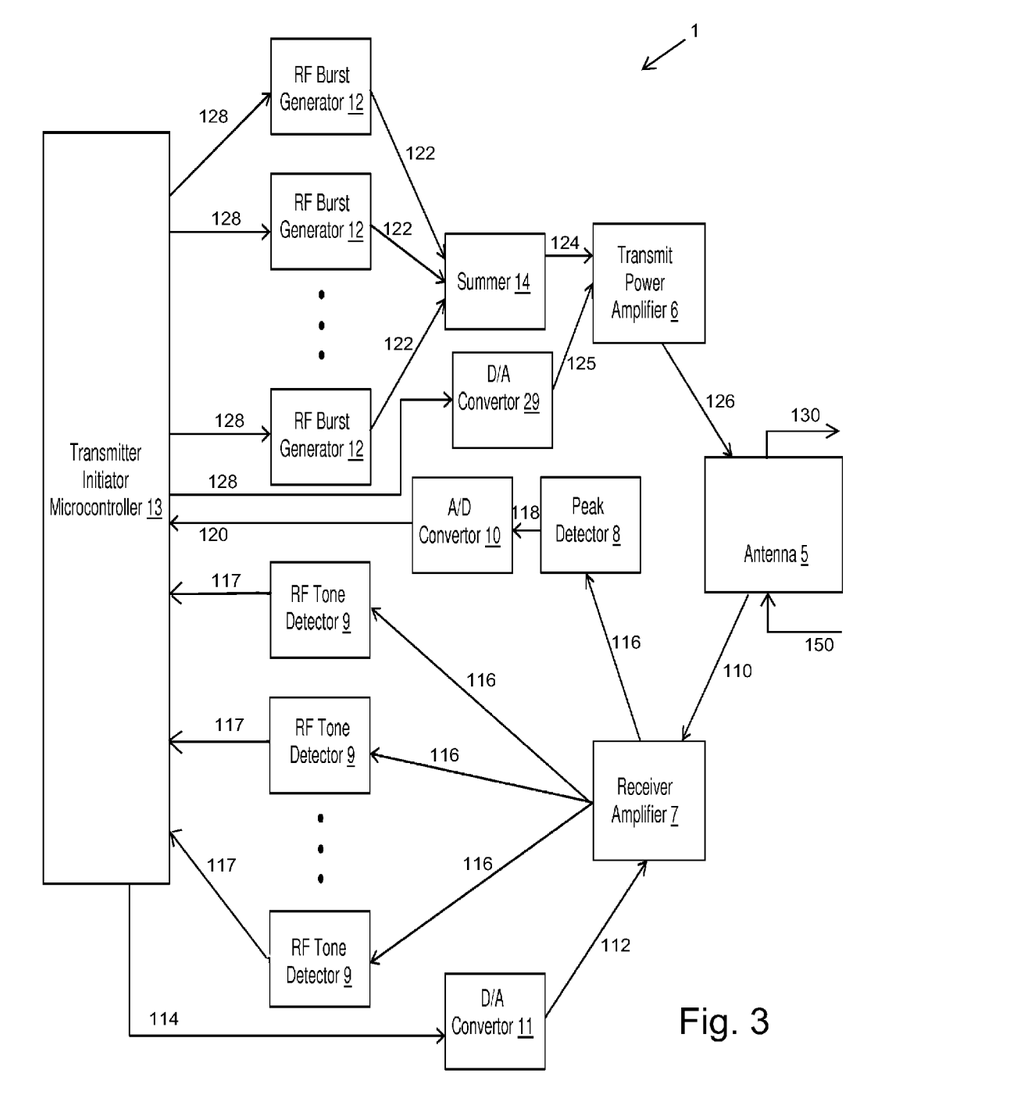
FIG. 3 is a block diagram of a transmitter initiator component of the control access system of FIG. 1.

FIG. 3 illustrates the internal functional blocks of an embodiment of transmitter initiator 1. Transmitter initiator 1 includes a magnetic flux antenna 5, a transmit power amplifier 6, a receiver amplifier 7, a peak detector 8, one or more RF tone detectors 9, an analog to digital converter 10, a digital to analog converter 11, one or more RF burst generators 12 (i.e., modulators), a transmitter initiator microcontroller 13, a summer 14, and a digital to analog converter 29. Preferably, antenna 5 is a focused-beam magnetic flux antenna.

Antenna 5 is electrically coupled with transmit power amplifier 6 and receiver amplifier 7. Transmit power amplifier 6 is additionally electrically coupled with D/A converter 29, and summer 14. D/A converter 29 additionally is electrically coupled with transmitter initiator microcontroller 13. Summer 14 is additionally electrically coupled with the plurality of RF burst generators 12. Each RF burst generator is also electrically coupled with transmitter initiator microcontroller 13.

Receiver amplifier 7 is additionally disposed electrically coupled with peak detector 8, D/A converter 11, and each RF tone detector 9. Peak detector 8 is additionally electrically coupled with A/D converter 10, which is electrically coupled with transmitter initiator microcontroller 13. Each RF tone detector 9 is electromagnetically coupled with transmitter initiator microcontroller 13 and with antenna 5. D/A converter 11 is electrically coupled with transmitter initiator microcontroller 13.

Receiver amplifier 7 has a gain value that is determined by the strength of an input signal 110 from antenna 5. Receiver amplifier 7 has multiple gain stages set by a programmable voltage value 114 from transmitter initiator microcontroller 13 and converted to an analog voltage 112 by DA converter 11. Peak detector 8 sends detected peak value 118 to A/D convertor 10, which converts peak value 118 to a digital peak value 120. Using digital peak value 120 to estimate the amplitude of input signal 110, software calculations of microcontroller 13 determine the value of each stage's gain. Amplified signal 116 from receiver amplifier 7 is also input to a plurality of RF tone detectors 9. Tone detector 9 demodulate signal 116 to provide a RF tone 117 value of 1, 0, or a symbol. For example, a tone frequency of 122 KHz is converted by A/D converter 10 to yield a value of 1; a tone frequency of 127 KHz is converted by A/D converter 10 to yield a value of 0. Data or identification values are a combination of the 1s and 0s in RF tones 117 received at transmitter initiator microcontroller 13.

Protocol firmware within transmitter initiator microcontroller 13 monitors the power at each stage and increases or decreases attenuation to maintain the power level within a prescribed predefined range. The range is based on the sensitivity of the chosen components of system 100. By averaging the power levels at each stage with an averaging algorithm, the software of microcontroller 13 also provides a more even response of system 100. Power monitoring and averaging calculations are performed in real time as the distance of open-air gap 46 changes between receiver 2 and transmitter 1.

During a transmit phase, firmware within transmitter initiator microcontroller 13 sends signal 128 that enables a particular RF burst generator 12 to generate RF burst signals 122. RF burst generators 12 are toggled on and off by signal 128 from microcontroller 13. Each RF burst signal 122 is input to summer 14 and the summed RF burst signal 124 is transmitted to power amplifier 6. In one embodiment, RF burst signal 122 is a sine wave with a frequency that corresponds to a value of 1, 0, or a symbol. Transmit power amplifier 13 transforms RF signal burst into a drive current 126 that is conducted through coil windings 43 of focused beam directional antenna 5. Drive current 126 is preferably on the order of several amperes, but the value of drive current 126 may differ depending on the current that system 100 is designed to use. Additionally, D/A converter 29 provides gain control signal 125 to transmit power amplifier 6 to adjust the range of transmitter initiator 1. Transmitter initiator 1 transmits an RF signal 130 that impinges on an antenna 15 of receiver responder 2 (discussed below). RF signal 130 has a particular modulation scheme and data structure that is unique to system 100. In one embodiment, Frequency Shift Keying (FSK) is used to provide a modulation scheme for RF signal 130 that varies both in intensity, frequency, phase, direction, or any combination of these.

Figure 4:
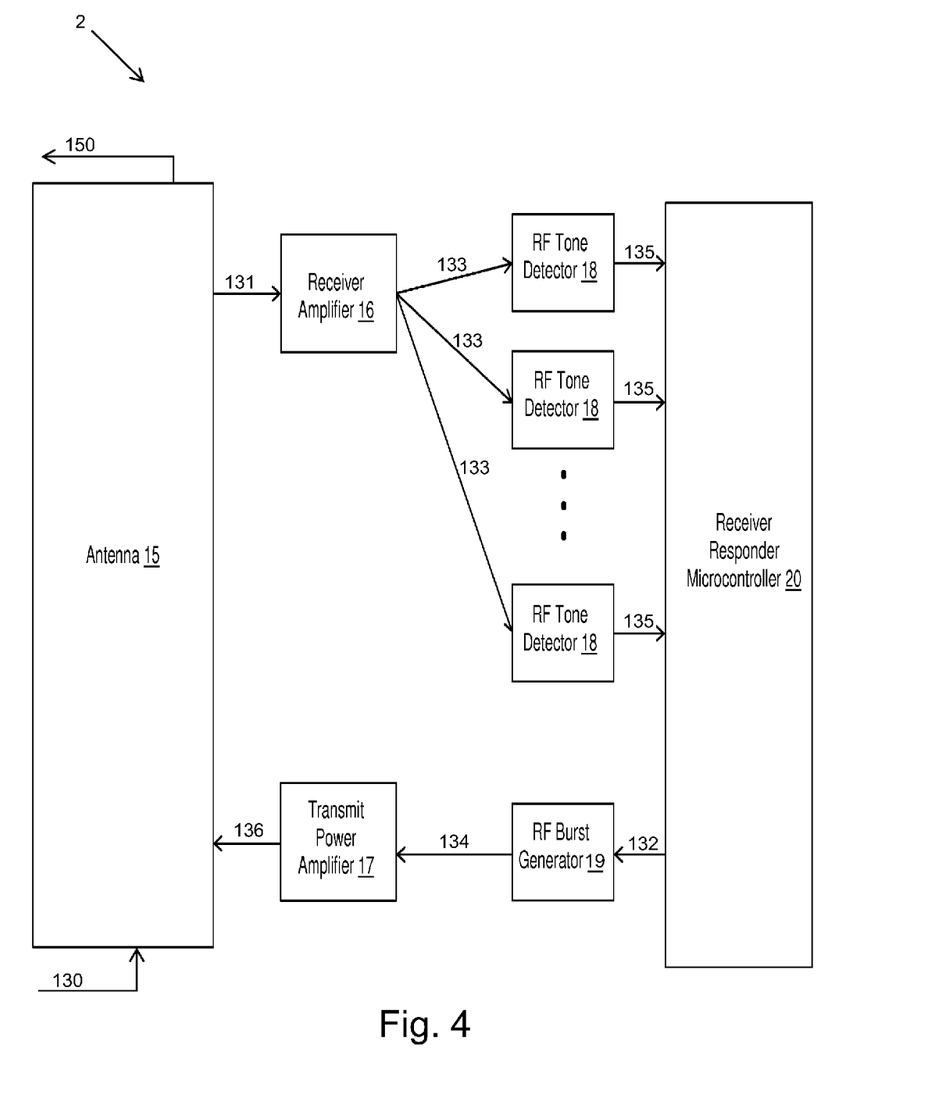
FIG. 4 is a block diagram of a receiver responder component of the control access system of FIG. 1.

FIG. 4 illustrates the internal functional blocks of an embodiment of receiver responder 2. Receiver responder 2 includes an antenna 15, a receiver amplifier 16, a transmit power amplifier 17, one or more RF tone detectors 18, an RF burst generator 19 (i.e., modulator), and a receiver responder microcontroller 20. In each receiver responder 2, antenna 15 is preferably an omni-directional magnetic flux antenna. In some embodiments, antenna 15 of one or more receiver responders 2 is a directional magnetic flux antenna 40 as described above.

Antenna 15 is electrically coupled with receiver amplifier 16 and transmit power amplifier 17. Receiver amplifier 16 is additionally electrically coupled with RF tone detectors 18, which are each additionally electromagnetically coupled with receiver responder microcontroller 20. Transmit power amplifier 17 is disposed in communication with RF burst generator 19, which is additionally disposed in communication with receiver responder microcontroller 20.

RF signal 130 impinges on antenna 15 and a RF signal 131 is communicated to receiver amplifier 16. Receiver amplifier 16 sends amplified signal 133 to each tone detector 18 for demodulation. Each tone detector 18 sends detected tones 135 to receiver responder microcontroller 20. Receiver responder 2 reacts by powering on when microcontroller 20 detects a particular RF signal. Microcontroller 20 then generates a serial data stream 132 from receiver responder microcontroller 20. RF burst generator 19 receives the serial data stream 132 from receiver responder microcontroller 20. Serial data stream 132 from microcontroller 20 toggles RF burst generator 19 on and off. RF signal 134 from RF burst generator 19 (e.g., a sine wave) is passed to transmit power amplifier 17 and has a frequency that corresponds to a value of 1, 0 or a symbol. RF signal 134 is converted to a current 136 by transmit power amplifier 17 and driven through antenna 15. Magnetic flux results from current 136 passing through antenna 15.

During a receipt phase of system 100, receiver responder 2 detects a particular frequency of signal 130 transmitted by antenna 5 of transmitter initiator 1. Frequency of signal 130 is preferably between 120 KHz and 135 KHz. Upon detection of frequency of signal 130, receiver responder 2 powers up. Receiver responder 2 then replies to transmitter initiator 1 by transmitting a particular tone burst 150 of magnetic energy. This tone burst 150 impinges upon antenna 5 of transmitter initiator, the same antenna used by transmitter initiator during the transmit sequence. Receiver amplifier 7 amplifies the resultant output 130 from antenna 5.

In one embodiment, receiver responder is a key fob that may be identified using a sequence of numbers in burst signal 134. In another embodiment, receiver responder 2 is a smart card or other portable device that is communication-operable with near-field magnetic inductance.

Figure 5:
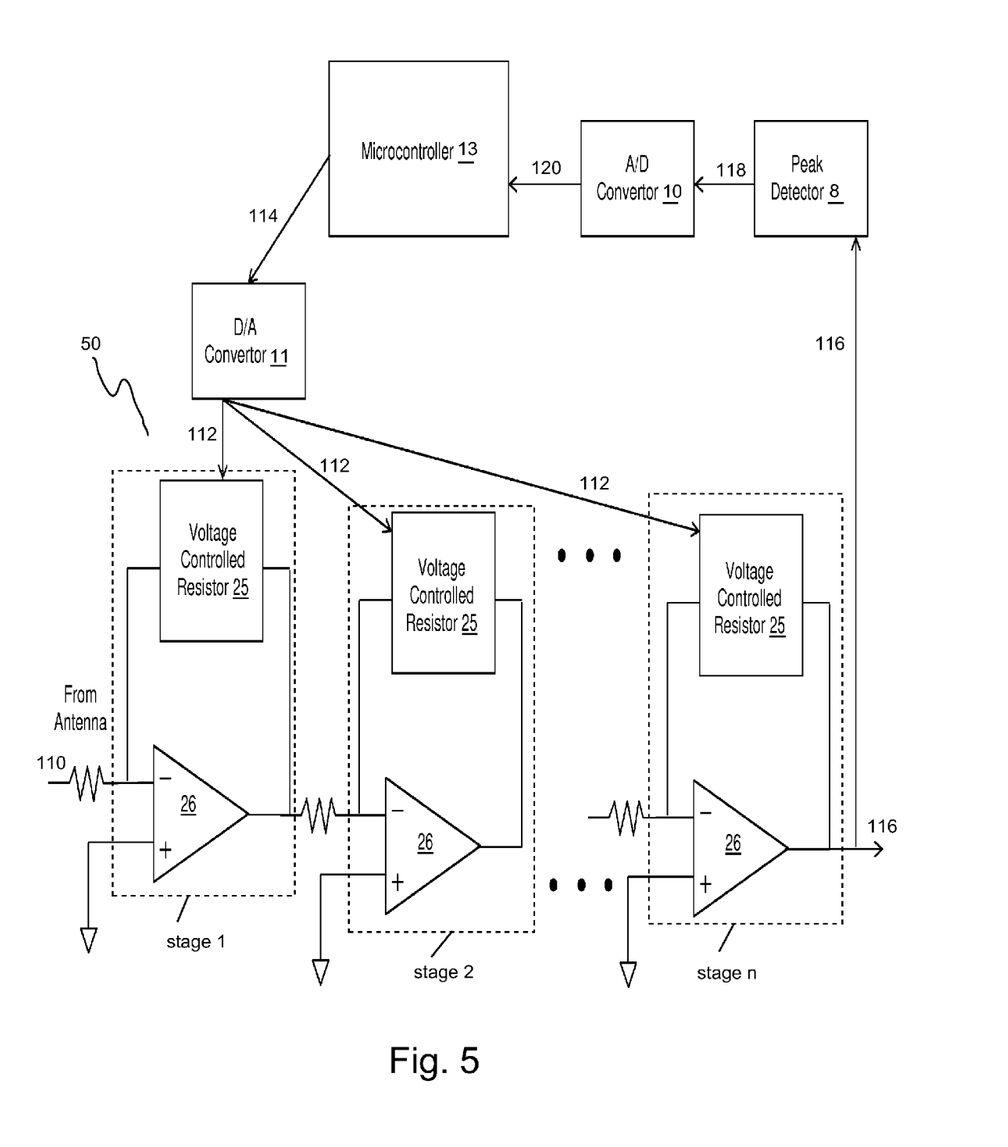
FIG. 5 is a block diagram of an embodiment of an adjustable gain amplifier component as included in the embodiment of the transmitter initiator of FIG. 3 and the receiver responder of FIG. 4.

FIG. 5 shows one embodiment of receiver amplifier 7 configured as an adjustable gain amplifier 50. Adjustable gain amplifier 50 is described here as it may be used in transmitter initiator 1; however, adjustable gain amplifier 50 may be used as amplifier 7 of transmitter initiator 1 and/or receiver amplifier 16 of receiver responder 2 and corresponding peak detector, A/D converter, D/A converter, and microcontroller. As used in the embodiment of transmitter initiator shown in FIG. 3, adjustable gain amplifier 50 has at least one stage (i.e., stage 1, stage 2, ..., stage n), each stage having one or more voltage controlled resistors 25 and one or more operational amplifiers 26. Amplifier 50 is electrically coupled to microcontroller 13, digital to analog converter 11, peak detector 8, and analog to digital converter 10.

Gain is adjusted by the control of the microcontroller 13 using intelligence embodied in software in microcontroller 13. Gain is adjusted dynamically via the voltage controlled resistors 25 coupled at each operational amplifier 26 (i.e., gain stage). It is contemplated that voltage-controlled resistors 25 may be placed at any point in the operational amplifier's feedback path 27. Any of amplifiers 6, 7, 16, 17 may comprise multiple gain stages (i.e., stage 1, stage 2, ..., stage 2) as illustrated in FIG. 5.

As shown in FIG. 5, an embodiment of the transmitter initiator shown in FIG. 3 has receiver amplifier 7 configured as an adjustable gain amplifier. In this embodiment, microcontroller 13 sends signal 114 to digital to analog (D/A) converter 11. Based on signal 114 received by D/A convertor 11, D/A convertor sends voltage 112 to each of voltage-controlled resistors 25. Voltage 112 determines the resistance and therefore the gain of each amplifier stage (i.e., stage 1, stage 2, . . . , stage n). Voltage settings are retained over time within microcontroller 13. Output signal 116 from final stage (stage n) of adjustable gain amplifier 50 is sent to peak detector 8, which measures and sends peak amplitude value 118 to analog to digital (A/D) converter 10. Digital value 120 is sent to and stored in microcontroller 13. The software of microcontroller 13, with knowledge of the voltage controlled resistor 25 settings and the output peak amplitude value 118, adjusts voltage controlled resistor 25 setting to maintain the output voltage 112 from D/A converter 11 to be within the range of amplifiers 26.

Figure 6:
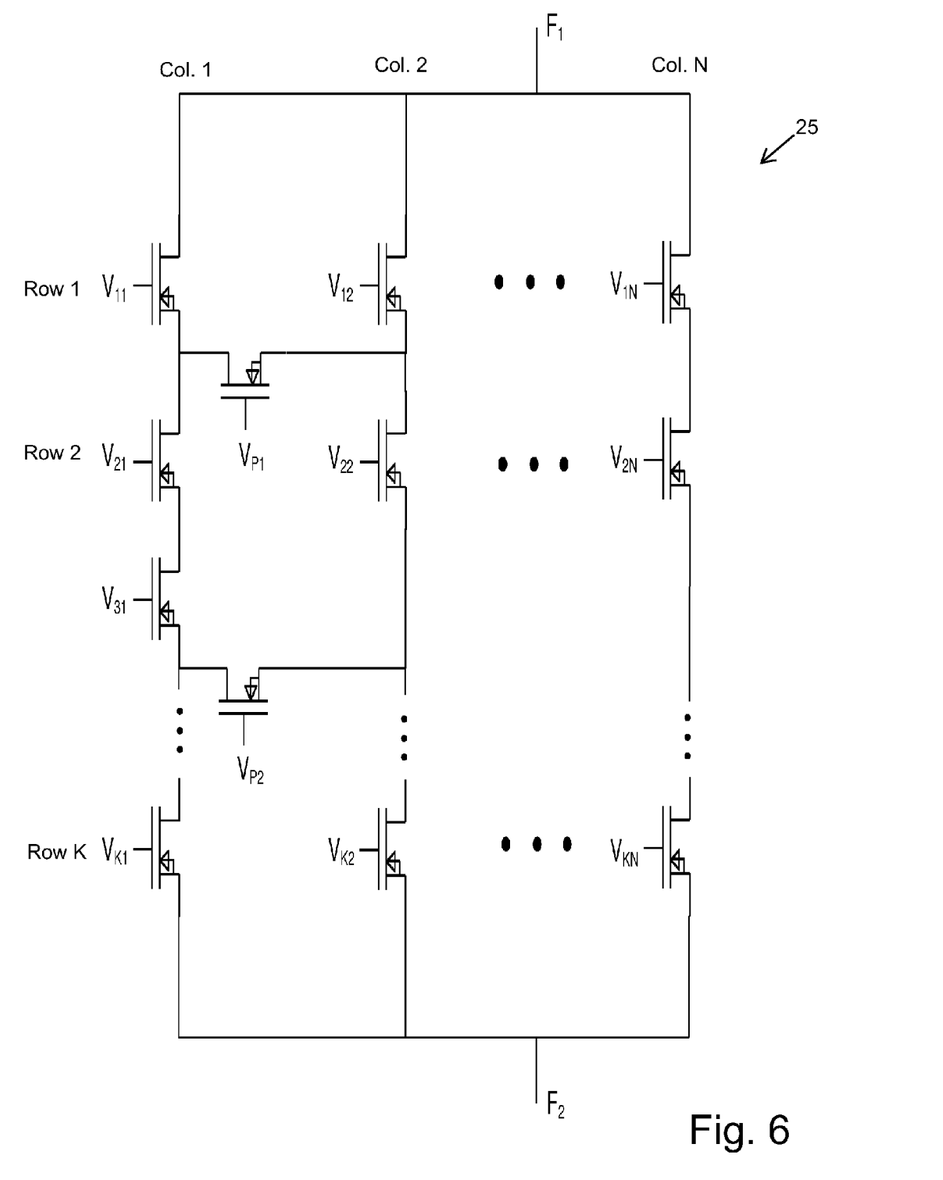
FIG. 6 is a circuit diagram of a voltage controlled resistor component of one embodiment of the adjustable gain amplifier of FIG. 5.

FIG. 6 shows an implementation of voltage controlled resistor 25 that enables microcontroller 13 to control a gain stage as shown in FIG. 5. An arrangement of field effect transistors (FETs) enables the resistance between nodes $F_1$ and $F_2$ to be set over a wider range than possible with a single field effect device. Specifically, the resistance range is increased by the combination of FET series resistances in each of columns Col. 1, Col. 2, . . . , Col. N along each of rows Row 1, Row 2, . . . , Row N. The adjustment of the resistance value occurs with the use of cross-column FETs. Microcontroller 13 software or firmware calculates the voltage values of $V_{11}$ through $V_{KN}$, as well as peak $V_{KN}$. With this arrangement, resistance between node $F_1$ and $F_2$ is precisely adjusted across a wide range of voltage values across nodes $F_1$ and $F_2$.

Figure 7:
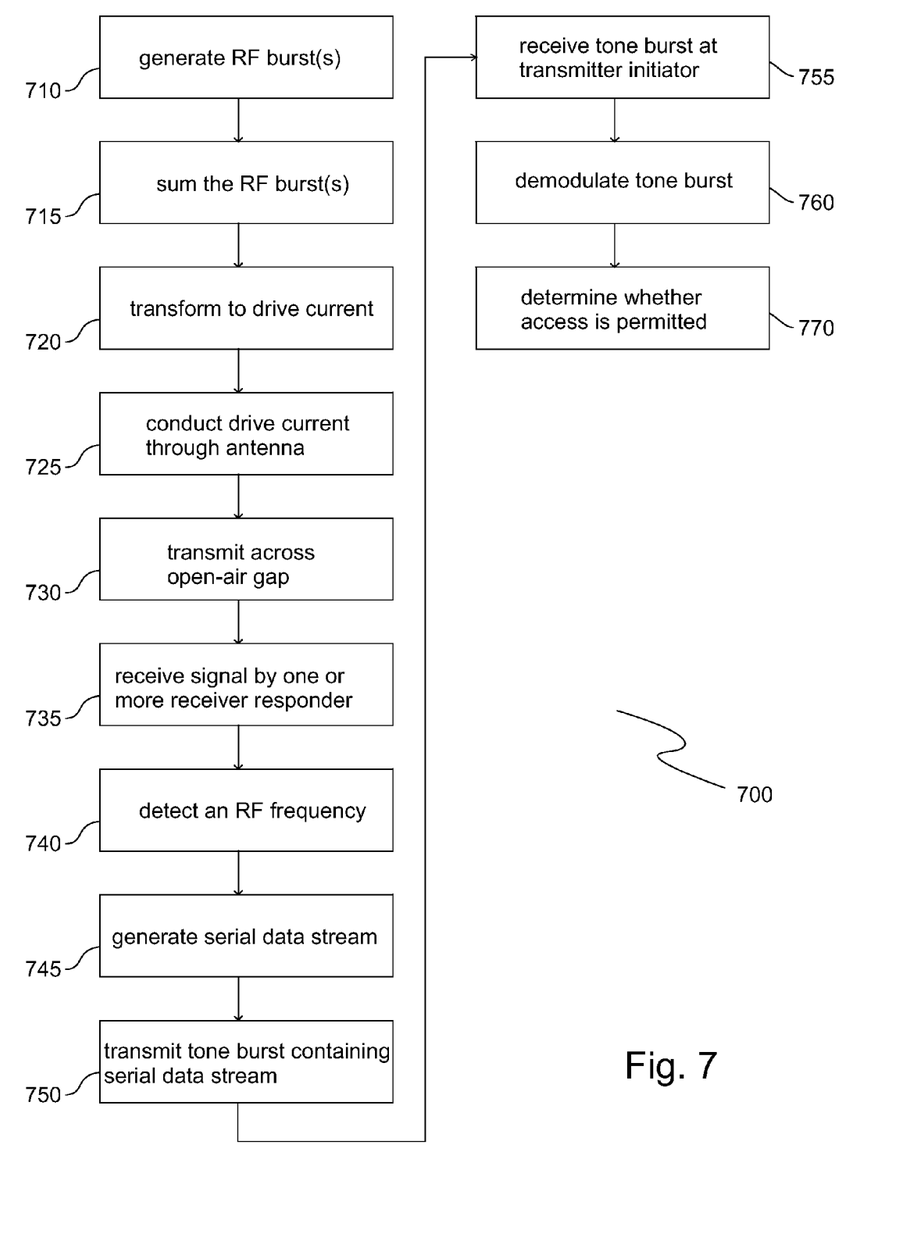
FIG. 7 is a flow chart illustrating an embodiment of a method of access control.

FIG. 7 illustrates the steps in an embodiment of a method 700 of access control. In step 710, transmitter initiator 1 generates at least one RF burst 122. In step 715, a summer 14 is used on the at least one RF burst 122 to produce a summed RF burst signal 124. In step 720, a power amplifier 6 transforms the summed RF burst signal 124 into a drive current 126. In step 725, the drive current 126 is conducted through the windings 43 of the transmitter initiator's magnetic flux antenna 5. In step 730, an RF initiator signal 130 is transmitted across an open air gap 46 via magnetic induction to at least one receiver responder 2. In step 735, one or more receiver responder 2 receives the RF initiator signal 130 across the open-air gap 46. The RF initiator signal 130 may optionally contain a unique identifier comprising a sequence of real, imaginary, or complex numbers.

In step 735, each receiver responder 2 has a receiver responder magnetic flux antenna 15 and at least one RF tone detector 18. Tone detectors 18 are demodulators that determine whether an incoming signal 133 represents a value of 1, 0 or a symbol. In step 740, each receiver responder 2 detects a frequency of the RF transmitter initiator signal 130. In step 745, based on the frequency of the RF transmitter initiator signal 130, a particular receiver responder 2 generates a serial data stream 132 having a unique identifier corresponding to the particular receiver responder 2. This step may take place in multiple receiver responders 2. In step 750, one or more receiver responders 2 transmit a responder tone burst 150 containing the serial data stream 132. In step 755, the transmitter initiator 1 receives the responder tone burst 150 at a transmitter initiator magnetic flux antenna 5. In step 760, the transmitter initiator 1 demodulates the responder tone burst 150 to provide a unique identifier value. In step 770, a control panel 3 or other device determines whether access is permitted based on comparing the unique identifier value with a value that is stored in or accessed by control panel 3.

Figure 8:
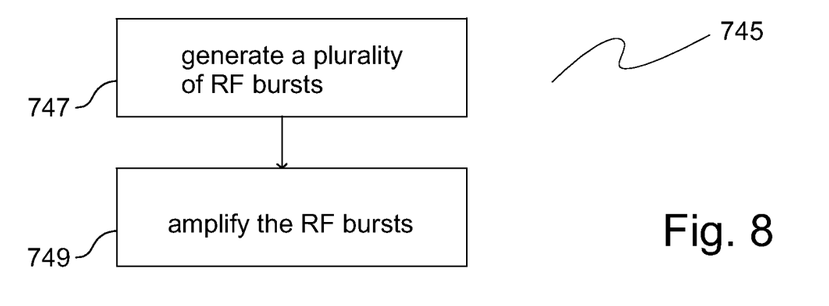
FIG. 8 is a flow chart illustrating optional steps of the method in FIG. 7.

As shown in FIG. 8, step 745 of generating a serial data stream 132 may optionally include the step 747 of generating a plurality of RF bursts 134 in the receiver responder and the step 749 of amplifying the plurality of RF bursts 134 by a transmit power amplifier 17.

Figure 9:
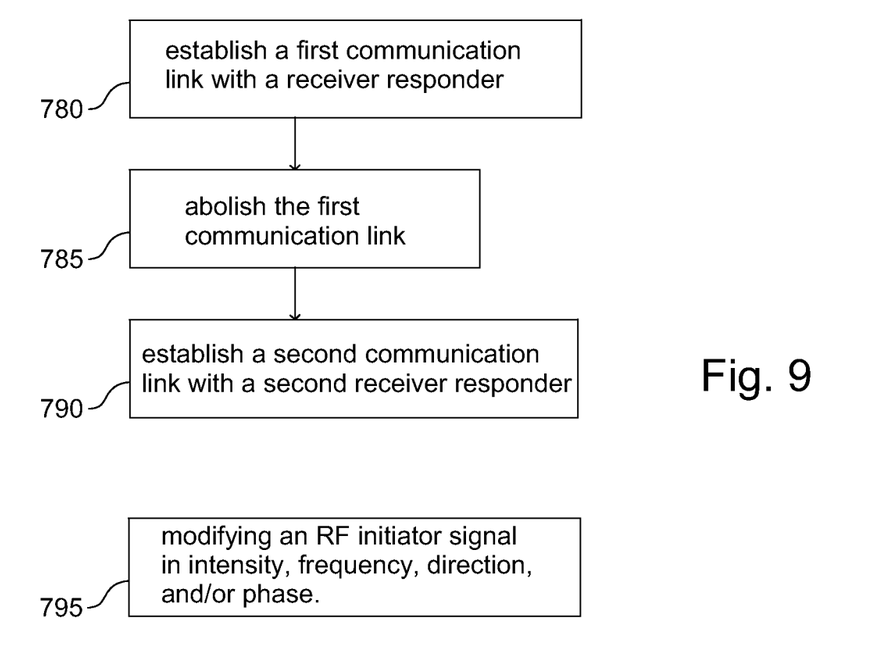
FIG. 9 is a flow chart illustrating optional steps of the method in FIG. 7.

As shown in FIG. 9, method 700 may optionally include the step 780 of establishing a first communication link with a first receiver responder 2, step 785 of abolishing the first communication link with the first receiver responder 2, and step 790 of establishing a second communication link with a second receiver responder 2.

In one embodiment, method 700 may optionally include the step of amplifying the receiver tone burst 134 with an adjustable gain amplifier 17. Amplification may be done using an adjustable gain amplifier having one or more stages. The adjustable gain amplifier may utilize a voltage controlled resistor 25 in each of the gain stages. Method 700 may also include the step 795 of modulating, by a RF tone detector 18, the RF initiator signal 130 in intensity, phase, frequency, and/or direction. Modulation preferably uses Frequency Shift Keying modulation.

In one embodiment of method 700, the transmitter magnetic flux antenna 5 is configured as a focused-beam antenna 40. In another embodiment of method 700, the receiver magnetic flux antenna 5 is configured as an omni-directional antenna.

In another embodiment of method 700, the RF initiator signal 130 and the responder tone burst 150 are between about 120 KHz and about 135 KHz.

In use, a gateway is positioned in proximity to the transmission initiator 1. As an entity carrying a receiver responder 2 approaches the gateway, magnetic flux antenna 5 of transmitter initiator 1 communicates with magnetic flux antenna 15 of receiver responder 2 via magnetic induction to indicate that the entity is authorized to pass through the gateway. Receiver responder 2 may be a key fob, smart card, or other item with RF communication capability that may be identified using a sequence of numbers in RF signal 150 sent to transmitter initiator 1.

In an example of system 100, each receiver responder 2 preferably has a unique code such as a serial number. Receiver responder 2 may also store a company identifier code or value. Receiver responder 2 opens its receiver for a short time (~milliseconds) every second or two. When receiver responder 2 receives a query RF signal 130 from transmitter initiator (e.g., a box located at a facility entrance gate), receiver responder 2 transmits the company code and serial number using Frequency Shift Keying (FSK). This is done one bit at a time or as multi-bit symbols, depending on the particular implementation. Additional information can be stored in receiver transponder 2 and transmitted using FSK if requested by transmitter initiator 1.

For example, if using FSK as a modulation scheme, system 100 may utilize four specific frequencies, one for each symbol. The desired symbol is sent from microcontroller 13 to RF burst generator 12, which sets the frequency of transmitted signal 122 to the correct frequency for the symbol. Receiver responder 2 receives signal 130 with frequency 130' and demodulates it back to the two bits. All of the data to be transmitted may be transmitted in this way, which requires significantly less time than transmitting the data one bit at a time.

As receiver responder 2 is moved closer to transmitter initiator, signal strength increases. Amplifier inputs and outputs are monitored by each component's microcontroller 13, 20 and gain is increased or decreased depending on movement of receiver responder 2 relative to transmitter initiator 1.

Typical output voltage from amplifiers 6, 7, 16, 17 is on the order of single millivolts, but depends on the chosen microcontrollers 13, 20.

Transmitter initiator 1 and receiver responder 2 use an agreed-upon FSK for a modulation scheme because it provides robust digital modulation at frequencies between 120 KHz and 135 KHz. A preferred control panel 3 uses Weigand protocols for communication with transmitter initiator 1, which allows other items such as cameras to be integrated into system 100. RF tone detectors 9 of transmitter initiator 1 demodulate incoming signal 116 and send detected tone 117 to microcontroller 13. Microcontroller 13 determines decodes detected tone 117 as a 1, 0 or a symbol. Similarly, tone detectors 18 in receiver responder demodulate incoming signal 133 from amplifier 16. As shown in FIG. 2, magnetic flux antenna 40 is configured as a directional antenna and has at least 60 dB signal attenuation in directions away from the target.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An access control system comprising:
    at least one receiver-responder comprising
        a receiver-responder magnetic flux antenna,
        a plurality of RF tone detectors electrically coupled with the receiver-responder magnetic flux antenna,
        a microcontroller electrically coupled with the plurality of RF tone detectors,
        a responder RF burst generator electrically coupled with the microcontroller and the receiver-responder magnetic flux antenna; and
    a transmitter initiator comprising
        a transmitter-initiator magnetic flux antenna constructed and arranged to direct a magnetic field in a particular angular direction across an open-air gap, wherein the transmitter-initiator magnetic flux antenna and the receiver-responder magnetic flux antenna define the open-air gap therebetween, and wherein the transmitter-initiator magnetic flux antenna comprises
            a paramagnetic housing,
            electromagnetic windings disposed within the paramagnetic housing, and
            at least one ferromagnetic element disposed within the open-air gap, wherein the paramagnetic housing and the ferromagnetic element are constructed and arranged to direct the magnetic field in the particular angular direction across the open-air gap, and
        a plurality of RF tone detectors electromagnetically coupled with the transmitter-initiator magnetic flux antenna,
        a transmitter-initiator microcontroller electromagnetically coupled with the plurality of RF tone detectors, the transmitter-initiator microcontroller demodulating communication from the receiver responder and controlling communication to the receiver responder, and
        a plurality of RF burst generators electrically coupled with the transmitter-initiator microcontroller and with the transmitter-initiator magnetic flux antenna;
    wherein the system wirelessly communicates between the transmitter initiator and the at least one receiver responder disposed in the specific angular region via near-field magnetic induction across the open-air gap; and
    wherein the microcontroller of the receiver responder demodulates communication from the transmitter initiator and controls communication to the transmitter initiator.

2. The access control system of claim 1, wherein the receiver-responder magnetic flux antenna is a focused-beam directional antenna comprising:
    a receiver paramagnetic housing, electromagnetic windings disposed within the receiver paramagnetic housing, and
    at least one receiver ferromagnetic element disposed within the open-air gap, wherein the paramagnetic housing and the receiver ferromagnetic element are constructed and arranged to direct a magnetic field across the open-air gap.

3. The access control system of claim 1, wherein the receiver-responder magnetic flux antenna is an omni-directional antenna.

4. The access control system of claim 1, wherein the at least one receiver-responder further comprises a power amplifier electrically coupled with the receiver-responder magnetic flux antenna, wherein the power amplifier is an adjustable gain amplifier comprising at least one gain stage having a voltage-controlled resistor, the voltage-controlled resistor being dynamically adjusted by the microcontroller in response to a power level impinging upon the receiver responder.

5. The access control system of claim 1, wherein the transponder initiator further comprises a power amplifier electrically coupled with the transmitter-initiator magnetic flux antenna, wherein the power amplifier is an adjustable gain amplifier comprising at least one gain stage having a voltage-controlled resistor, the voltage-controlled resistor being dynamically adjusted by the transmitter-initiator microcontroller in response a power level impinging on the transmitter initiator.

6. The access control system of claim 1, wherein the at least one receiver responder generates an RF tone burst having a frequency from about 120 KHz to about 135 KHz and is selected from the group consisting of a fob, a smart card, and a portable device communication-operable with near-field magnetic inductance.

7. The access control system of claim 1, wherein the open air gap is from about 2 to about 5 meters and wherein the receiver responder is a portable device sized for hand-held use.

8. The access control system of claim 7, wherein the transmitter initiator and the receiver responder wirelessly communicate a signal having a frequency from about 120 KHz to about 135 KHz.

9. A method of access control comprising the steps of:
    generating at least one RF burst at a transmitter initiator;
    summing the at least one RF burst into a summed RF burst signal;
    transforming the summed RF burst signal into a drive current;
    conducting the drive current through coil windings of a directional magnetic flux antenna;
    transmitting an RF initiator signal directed in a particular angular direction via magnetic induction across an open air gap to at least one receiver responder using the directional magnetic flux antenna;
    receiving the RF initiator signal across the open air gap by the at least one receiver responder, wherein the at least one receiver responder has a receiver-responder magnetic flux antenna and a RF tone detector;

detecting a frequency of the RF initiator signal by using the at least one receiver responder;

generating a serial data stream by the at least one receiver responder and based on the frequency of the RF initiator signal, the serial data stream having a unique identifier corresponding to the at least one receiver responder;

transmitting at least one responder tone burst by using the receiver responder, the at least one responder tone burst containing the serial data stream;

receiving the responder tone burst at the directional magnetic flux antenna;

demodulating the at least one responder tone burst to provide a unique identifier value by using the transmitter initiator; and determining whether access is permitted based on the unique identifier value.

10. The method of claim 9, wherein the directional flux antenna is a focused-beam antenna.

11. The method of claim 9, wherein the receiver magnetic flux antenna is an omni-directional antenna.

12. The method of claim 9, wherein the step of generating a serial data stream further comprises the steps of:
generating a plurality of RF bursts;
summing the plurality of RF bursts, thereby providing a summed burst signal; and
amplifying the summed burst signal.

13. The method of claim 9, further comprising the steps of:
amplifying the receiver tone burst with an adjustable gain amplifier; and
dynamically adjusting a gain of the adjustable gain amplifier in response to a signal level of the receiver tone burst, wherein the signal level of the receiver tone burst increases as the distance decreases between the at least one receiver responder and the transmitter initiator.

14. The method of claim 9, further comprising the step of modulating, by the transmitter initiator, the RF initiator signal in at least one of intensity, frequency, phase, and direction.

15. The method of claim 14, wherein the step of modulating by the at least one receiver responder includes using Frequency Shift Keying modulation to provide modulation at frequencies from about 120 KHz to about 135 KHz wherein the at least one receiver responder is a portable device sized for hand-held use.

16. The method of claim 9, wherein the step of transmitting the RF initiator signal and the step of transmitting at least one responder tone burst are performed with the RF initiator signal and the at least one responder tone burst each having a frequency in a range between about 120 KHz and about 135 KHz.

17. The method of claim 9, wherein the step of transmitting an RF initiator signal RF initiator signal includes transmitting a unique identifier comprising a sequence of complex numbers.

18. The method of claim 9, further comprising the steps of:
opening a receiver of a first one of the at least one receiver responder for a length of time on the order of milliseconds;
detecting, by the first one of the at least one receiver responder, a first query RF signal transmitted by the transmitter initiator;
establishing a first communication link between the first one of the at least one receiver responder and the transmitter initiator;
abolishing the first communication link between the first one of the at least one receiver responder and the transmitter initiator; and
opening a receiver of a second one of the at least one receiver responder for a length of time on the order of milliseconds;
detecting, by the second one of the at least one receiver responder, a second query RF signal transmitted by the transmitter initiator;
establishing a second communication link between the second one of the at least one receiver responder and the transmitter initiator.

* * * * *